United States Patent [19]

Doerffel et al.

[11] Patent Number: 4,478,994

[45] Date of Patent: Oct. 23, 1984

[54] USE OF UNSATURATED POLYESTERS AS ADDITIVE BINDERS IMPROVING ADHESION IN COATING AGENTS FOR COATING OF METALS

[75] Inventors: Joerg Doerffel; Hans-Joachim Zech, both of Marl, Fed. Rep. of Germany

[73] Assignee: Chemische Werke Huels, Marl, Fed. Rep. of Germany

[21] Appl. No.: 566,457

[22] Filed: Dec. 28, 1983

[30] Foreign Application Priority Data

Dec. 28, 1982 [DE] Fed. Rep. of Germany ....... 3248325

[51] Int. Cl.$^3$ .............................................. C08G 63/54
[52] U.S. Cl. .................................... 528/304; 528/306
[58] Field of Search ................................ 528/304, 306

[56] References Cited

U.S. PATENT DOCUMENTS 2,904,533 9/1959 Carlston et al. ..................... 528/304
4,113,898 9/1978 Gardziella et al. .............. 528/304 X
4,205,115 5/1980 Piccirilli et al. ................ 528/304 X Primary Examiner—Lucille M. Phynes
Attorney, Agent, or Firm—Millen & White

[57] ABSTRACT

Unsaturated polyesters based on isophthalic acid are used as additive binders in coating agents. With the use of these polyesters, the resultant coatings have an adhesiveness to metallic substrates to be protected which is improved in relation to the comparable state of the art coatings. Furthermore, coatings are obtained by which the conditions for the protection of metals from corrosion (good adhesion of the coatings on metallic, in particular, critical metallic substrates, and good resistance of the coatings to environmental influences, in particular, good resistance to hydrolysis) are improved. Hence, improved protection from corrosion is achieved.

11 Claims, No Drawings

USE OF UNSATURATED POLYESTERS AS ADDITIVE BINDERS IMPROVING ADHESION IN COATING AGENTS FOR COATING OF METALS

BACKGROUND OF THE INVENTION

In the coating of metals, protection from corrosion, i.e., the function of preserving their value, holds an equally prominent place with the decorative function. Protection from corrosion includes protection from environmental influences, particularly the influences of weather, water and aggressive media (chemicals). To perform this function, the coating must be resistant to influences of the environment. Moreover, the bond between coating and substrate, i.e., adhesion of the coating to the metallic substrate to be protected, must be as good as possible.

In recognition of these relationships, unsaturated polyesters have been used as additive binders to improve the adhesion of the coatings based on conventional binders. One group of state of the art polyesters is characterized by the absence of isophthalic acid in the acid component and by the presence of industrial mixtures of Formula I diols in the alcohol component of the monomer mixture on which the polyesters are based (DE-PS No. 953 117).

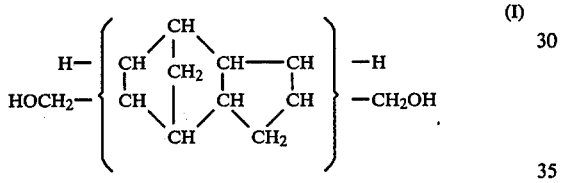

Experience has revealed a need to improve the adhesion of coatings produced with state of the art additive binders, especially with respect to such critical substrates as galvanized steel.

SUMMARY OF THE INVENTION

Accordingly, it is an object of this invention to provide additive binders that make it possible to improve the adhesion of coatings made with them to the metallic substrate to be protected and to provide the resultant coatings.

Upon further study of the specification and appended claims, further objects and advantages of this invention will become apparent to those skilled in the art.

These objects have been achieved by providing unsaturated polyesters useful as additive binders improving adhesion in coating agents for coating metals and the coating agents resulting, whereby the coating agents contain conventional binders and the polyesters are used in an amount of 1 to 50 wt % relative to the total amount of binder, the polyesters being produced in the usual way through polycondensation of a monomer mixture comprising an acid component (defined by indicating the total number of C-atoms of the individual dicarboxylic acids which always includes the C-atoms of the carboxyl groups) and an alcohol component, wherein 1.1 the monomer acid component comprises 10 to 75 mol % of isophthalic acid (IPA), 15 to 75 mol % of one or more α,β-olefinic unsaturated $C_{4-5}$-dicarboxylic acids and 0 to 30 mol % of a 1,2- or 1,4-benzenedicarboxylic acid, a saturated aliphatic $C_{4-12}$-dicarboxylic acid, a cycloaliphatic $C_{8-10}$-dicarboxylic acid, or a mixture thereof, 1.2 the monomer alcohol component comprises 85 to 100 mol % of a $C_{2-10}$-aliphatic diol, the OH groups being separated from one another by 2 to 8 C-atoms wherein one or two of the C-atoms can be replaced by O-atoms in such a way that these are separated from the OH groups and from one another by at least 2 C-atoms, a $C_{6-15}$-cycloaliphatic diol, the OH groups being separated from one another by 2 to 8 C-atoms, or a mixture thereof, and 0 to 15 mol % of one ore more $C_{3-6}$-aliphatic polyols with 3 or 4 OH groups, 2 the polyesters have an average relative molecular weight ($\overline{M}_n$) of 2 000 to 6 000, determined by conventional titration of the end groups, and an acid value of 10 to 50 mg KOH/g.

In various preferred aspects:

3.1 the monomer acid component comprises 20 to 75 mol % of IPA, 20 to 75 mol % of one or more α,β-olefinic unsaturated $C_{4-5}$-dicarboxylic acids and 0 to 20 mol % of a 1,2- or 1,4-benzenedicarboxylic acid, a saturated aliphatic $C_{4-12}$-dicarboxylic acid, a cycloaliphatic $C_{8-10}$-dicarboxylic acid, or a mixture thereof, and 3.2 the monomer alcohol component comprises 85 to 100 mol % of a diol and 0 to 15 mol % of one or more $C_{3-6}$-aliphatic polyols with 3 or 4 OH groups, wherein the diol comprises 70 to 100 mol % of 1,2-propanediol, neopentyl glycol (NPG), 1,4-bis(hydroxymethyl)-cyclohexane (CHDM), a diol or a mixture of diols of Formula I

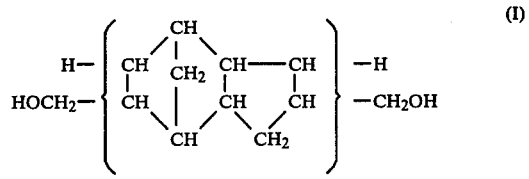

or a mixture thereof, and 0 to 30 mol % of one or more other aliphatic or cycloaliphatic diols; or 4 the monomer acid component comprises 30 to 70 mol % of IPA and 30 to 70 mol % of fumaric acid, maleic acid or anhydride, or a mixture thereof; or 5 the polyesters have a molecular weight of 2 500 to 5 000 and an acid value of 12 to 30, and 6 are introduced in an amount of 1 to 30 wt %, relative to the total amount of binder; or 7 the monomer alcohol component comprises 20 to 75 mol % of 1,2-propanediol and 25 to 80 mol % of CHDM, a mixture of Formula I diols, or a mixture thereof; or 8.1 the monomer acid component comprises 30 to 75 mol % of IPA, 20 to 70 mol % of one ore more α,β-olefinic unsaturated $C_{4-5}$-dicarboxylic acids and 0 to 20 mol % of a 1,2- or 1,4-benzenedicarboxylic acid, a saturated aliphatic $C_{4-12}$-dicarboxylic acid, a cycloaliphatic $C_{8-10}$-dicarboxylic acid, or a mixture thereof, and 8.2 the monomer alcohol component comprises 10 to 90 mol % of NPG and 10 to 90 mol % of CHDM, a mixture of Formula I diols, or a mixture thereof or 0 to <20 mol % of 1,2-propanediol and >80 to 100 mol % of CHDM, a mixture of Formula I diols, or a mixture thereof; or 9 the monomer acid component comprises 30 to 70 mol % of IPA and 30 to 70 mol % of fumaric acid, maleic acid or anhydride, or a mixture thereof; or 10 the monomer acid component comprises 40 to 60 mol % of IPA and 40 to 60 mol % of fumaric acid, maleic acid or anhydride, or a mixture thereof; or 11 the monomer alcohol component comprises 40 to 90 mol % of NPG and 10 to 60 mol % of CHDM, a mixture of Formula I diols, or a mixture thereof.

DETAILED DISCUSSION

These polyesters can be considered known. Their preparation and varying structures within the foregoing requirements are fully conventional and are disclosed in Ullmann, vol. 19 (fourth edition, 1980) 80 whose disclosures are incorporated by reference herein.

Under comparable conditions, the adhesiveness of coatings increases, as a rule, with increasing IPA proportions in the acid component. Suitable $\alpha,\beta$-olefinic unsaturated $C_{4-5}$-dicarboxylic acids, for example, include itaconic, mesaconic, citraconic and especially fumaric and maleic acids, anhydrides also being employable. Suitable 1,2- and 1,4-benzenedicarboxylic acids, for example, include phthalic acid and its anhydride and terephthalic acid.

Suitable saturated aliphatic $C_{4-12}$-dicarboxylic acids, for example, include adipic and azelaic acids.

Suitable cycloaliphatic $C_{8-10}$-dicarboxylic acids, for example, include hexahydrophthalic acid, tetrahydrophthalic acid and hexahydroterephthalic acid.

Suitable $C_{2-10}$-aliphatic diols, for example, include ethylene glycol, 1,3-butanediol, 1,4-butanediol, 2,2,4-trimethyl-1,3-pentanediol, 1,6-hexanediol, preferably 1,2-propanediol and NPG.

Suitable $C_{2-10}$-aliphatic diols having ether oxygen, for example, include diethylene glycol, dipropylene glycol and triethylene glycol.

Suitable $C_{6-15}$-cycloaliphatic diols, for example, include CHDM and Formula I diols (especially industrial diol mixtures).

Suitable $C_{3-6}$-aliphatic polyols with 3 or 4 OH groups, for example, include glycerin and 1,1,1-trimethylolpropane. As a rule, the polyol portion of the monomer alcohol component is $\leq 10$ to 15 mol % to prevent gelation of the polyester.

As a rule, the adhesiveness of the coatings increases with increasing molecuar weight of the polyester. The production of the polyesters is basically known. It can be accomplished through azeotropic condensation or melting condensation of the monomer mixture, as a rule, at temperatures of 150° to 250° C. All the monomers can be present at the start of the reaction and, after obtaining the desired conversion, the reaction can be stopped (See Method a below). The polyesters are preferably prepared in two steps (Method b). In the first step, the entire alcohol component is reacted with the IPA to a point where a homogeneous reaction mixture is obtained. Then, the rest of the acid component is added and condensation is continued as in the one-step process variant.

The mole ratio of alcohol component/acid component is generally 1–1.06, preferably 1.01–1.04, to 1. In general, the molecular weight of the polyesters is controlled by this mole ratio and by the acid value. It increases with decreasing mole ratio and decreasing acid value; it decreases with increasing mole ratio and increasing acid value. The preferred acid value is 15 to 25 mg KOH/g. Acid value is conventionally controlled by titration using a solution of potassium hydroxide in methanol.

Polyesters are preferably introduced into the coating agents in amounts of 5 to 20 wt%, relative to the total amount of binder. The coating agents are otherwise conventionally prepared.

The coating agents contain conventional binders, e.g., vinyl chloride homopolymers or copolymers, chlorinated rubber, nitrocellulose, cellulose acetate butyrates, alkyd resins, acrylic resins, polyesters, epoxy resins, silicone resins or polyurethanes, in the conventional amounts. The binders, in addition, can contain cross-linking agents as polyisocanates, phenol resins and/or aminoplasts. The coating agents contain conventional binders, the additive binders of the invention and optionally cross-linking agents in total amounts of 10–90 wt % of the total composition. In addition to binders, the coating agents also contain additives e.g., solvents, pigments, dyes, or fillers and the usual adjuvants, for example, leveling agents. Typically, these are contained in amounts of 10–90 wt % in total.

Using the polyesters of this invention, coatings can be obtained that exhibit good mechanical properties, good gloss and good resistance to solvents and spotting. Not only is the adhesion to the substrate improved, but also the adhesion of various coats of the varnish to one another is often improved. The coating agents of this invention are conventionally applied.

Particularly with respect to aspects 8.1–11 above, polyester coatings of this invention are obtained by which the conditions for the protection of metals from corrosion (good adhesion of the coatings on metallic, particularly critical metallic substrates and good resistance of the coatings to influences of the environment, particularly good resistance to hydrolysis) are improved, so that improved protection from corrosion can be expected.

Critical metallic substrates include, for example, hot- or electrolytically galvanized steel, aluminum and other non iron metals.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

In the examples, parts (p) refer to parts by weight, and percentages mean weight percentages. Reference examples that do not pertain to the invention are designated with capital letters.

EXAMPLES

Production of the polyesters

Method a (Example 5)

539.5 g of IPA (3.25 mol), 318.5 g of maleic acid anhydride (MAA, 3.25 mol), 620.6 g of NPG (5.97 mol) and 95.5 g of CHDM (0.66 mol) were added together, stirred, bubbled with nitrogen for 2 h at 150° C. and for 20 h at 205° C. A light-yellow product with an acid value (AV) of 21 mg KOH/g and a hydroxyl value of 19 mg KOH/g was obtained. $\overline{M}_n$:2 800. All examples designated method (a) in the Table were prepared by this procedure.

Method b (Example 9)

539.5 g of IPA (3.25 mol), 516.9 g of NPG (4.97 mol) and 325.4 g of a technical mixture of formula I diols (diol I, 1.66 mol) were added together, stirred and bubbled with nitrogen for 2 h at 150° C. and for 4 h at 205° C. The resulting reaction mixture was clear (AV 21). After cooling to 130° C., 377 g of fumaric acid (FA, 3.25 mol) was added, the temperature was raised to 205° C. within 3 h and this temperature maintained for another 11 h. A yellowish product (AV 20, hydroxyl value 11, $\overline{M}_n$:3 610) was obtained. All examples designated method (b) in the Table were prepared by this procedure.

Production of vinyl chloride copolymer coating agents 97.5 p of a commercial vinyl chloride copolymer, 10 p of di-(2-ethylhexyl)-phthalate, 2 p of a commercial epoxy resin and 10 p of the polyester to be tested were dissolved in a solvent mixture of 49 p of methylisobutyl-ketone, 67 p of xylene, 73 p of an aromatic petroleum distillate (boiling range 155°–173° C.) and 73 p of ethyl glycol acetate. To this solution were added 34 p of a commercial thickener (10%), 2.5 p of a 1% xylene silicone oil solution, 49 p of a titanium dioxide pigment, 32.8 p of a dolomite filler and 0.25 p of a carbon black. The resulting mixture was ground for 20 min in a bead mill.

Production of coatings and adhesion test

After a 24-hour curing period the coating agents were applied on hot-galvanized steel sheets (thickness of the coating after solvent evaporation: 50±5 μm). After a one week drying period at 50° C., adhesion was tested by determining the square-cut adhesion values according to DIN 53 151 (See Table).

Testing the hydrolysis resistance of the polyesters

The polyesters were dissolved in toluene (50% solids). Wet films of these solutions were applied on glass plates. The films were dried for 16 h at 50° C. The plates with the residual transparent coatings were stored for 8 d in 10% aqueous NaOH solution at room temperature and the coatings then visually evaluated (See Table).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

TABLE

Adhesion of Vinyl Chloride Copolymer Coatings to Galvanized Steel Sheets
Resistance to Hydrolysis of Polyester Coatings on Glass Plates

| (1) Example | (2) Acid Component [Mol %] | (3) Alcohol Component [Mol %] Polyester | (4) Production Method | (5) AV [mg KOH/g] | (6) $\overline{M}_n$ | (7) GT Values of coatings | (8) Appearance of Coatings Following Treatment with 10% NaOH Solution |
|---|---|---|---|---|---|---|---|
| 1 | IPA/MAA (50/50) | NPG/TMP (90/10) | a | 20 | 2 600 | 2 | |
| 2 | IPA/FA/PAA (25/50/25) | NPG/Diol I (67/33) | b | 15 | 4 000 | 2 | clear |
| 3 | IPA/MAA (50/50) | PG (100) | a | 24 | 3 100 | 1–2 | cloudy |
| 4 | IPA/FA/MAA (50/33/17) | NPG (100) | a | 16 | 3 200 | 1 | cloudy |
| 5 | IPA/MAA (50/50) | NPG/CHDM (90/10) | a | 21 | 2 800 | 0–1 | |
| 6 | IPA/FA (60/40) | NPG/CHDM (75/25) | b | 17 | 4 200 | 0 | clear |
| 7 | IPA/FA (50/50) | NPG/CHDM (50/50) | b | 20 | 2 600 | 0 | |
| 8 | IPA/FA (50/50) | CHDM (100) | b | 18 | 2 700 | 0 | |
| 9 | IPA/FA (50/50) | NPG/Diol I (75/25) | b | 20 | 3 600 | 0 | clear |
| 10 | IPA/FA (50/50) | NPG/Diol I (67/33) | b | 17 | 4 200 | 1 | clear |
| 11 | IPA/MAA (33/67) | NPG/Diol I (50/50) | b | 20 | 3 100 | 1 | |
| 12 | IPA/MAA (50/50) | NPG/Diol I (50/50) | b | 16 | 4 100 | 0 | |
| 13 | IPA/MAA (67/33) | NPG/Diol I (50/50) | b | 16 | 3 900 | 1 | |
| A | MAA/PAA (67/33) | NPG/Diol I (50/50) | a | 15 | 3 600 | 5 | |
| B | MAA/PAA (67/33) | Diol I (100) | a | 14 | 3 500 | 4 | |
| C | IPA/MAA (50/50) | NPG/CHDM (90/10) | a | 20 | 1 700 | 4 | |

AV = acid value; $\overline{M}_n$ = relative molecular weight rounded to hundreds; GT values = square-cut adhesion values (assessment according to DIN 53 151); IPA = isophthalic acid; MAA = maleic acid anhydride; FA = fumaric acid; PAA = phthalic acid anhydride; NPG = neopentyl glycol; TMP = 1,1,1-trimethylolpropane; PG = 1,2-propanediol; CHDM = 1,4-cyclohexanedimethanol (= 1,4-bis-(hydroxymethyl)-cyclohexane).

What is claimed is:

1. In a coating agent useful in coating metals and containing a binder component which comprises 1–50 wt % of a polyester binder, the latter based on a monomer acid component and a monomer alcohol component, the improvement wherein, the monomer acid component comprises 10 to 75 mol % of isophthalic acid, 15 to 75 mol % of one or more α,β-olefinic unsaturated $C_4$-dicarboxylic acids and 0 to 30 mol % of a 1,2- or 1,4-benzenedicarboxylic acid, a saturated aliphatic $C_{4-12}$-dicarboxylic acid, a cycloaliphatic $C_{8-10}$-dicarboxylic acid, or a mixture thereof, the monomer alcohol component comprises 85 to 100 mol % of a $C_{2-10}$-aliphatic diol, the OH groups being separated from one another by 2 to 8 C-atoms wherein one or two of the C-atoms can be replaced by O-atoms in such a way that these are separated from the OH groups and from one another by at least 2 C-atoms, a $C_{6-15}$-cycloaliphatic diol, the OH groups being separated from one another by 2 to 8 C-atoms, or a mixture thereof, and 0 to 15 mol % of one ore more $C_{3-6}$-aliphatic polyols with 3 or 4 OH groups, and the polyester has an average relative molecular weight ($\overline{M}_n$) of 2 000 to 6 000, determined by titration of the end groups, and an acid value of 10 to 50 mg KOH/g.

2. A coating agent of claim 1 wherein the monomer acid component comprises 20 to 75 mol % of isophthalic acid, 20 to 75 mol % of one or more α,β-olefinic unsaturated $C_{4-5}$-dicarboxylic acids and 0 to 20 mol % of a 1,2- or 1,3-benzenedicarboxylic acid, a saturated aliphatic $C_{4-12}$-dicarboxylic acid, a cycloaliphatic $C_{8-10}$-dicarboxylic acid, or a mixture thereof, the monomer alcohol component comprises 85 to 100 mol % of a diol and 0 to 15 mol % of one or more $C_{3-6}$-aliphatic polyols with 3 or 4 OH groups, wherein the diol comprises 70 to 100 mol % of 1,2-propanediol, neopentyl glycol, 1,4-bis-(hydroxymethyl)-cyclohexane, a diol or mixture of diols of the formula

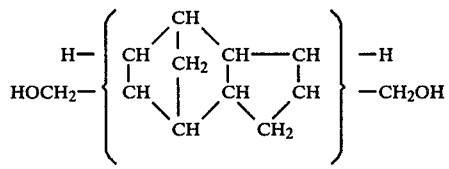

or a mixture thereof, and 0 to 30 mol % of one or more other aliphatic or cycloaliphatic diols.

3. A coating agent of claim 1 or 2 wherein the monomer acid component comprises 30 to 70 mol % isophthalic acid and 30 to 70 mol % of fumaric acid, maleic acid or anhydride or a mixture thereof.

4. A coating agent of claim 1, 2 or 3 wherein the polyester has a molecular weight of 2 500 bis 5 000 and an acid value of 12 to 30 and is contained in an amount of 1 to 30 wt %, relative to the total amount of binder.

5. A coating agent of claim 3 or 4 wherein the monomer alcohol component comprises 20 to 75 mol % of 1,2-propanediol and 25 to 80 mol % of 1,4-bis-(hydroxymethyl)-cyclohexane, a mixture of diols of said formula, or a mixture thereof.

6. A coating agent of claim 2 or 4 wherein the monomer acid component comprises 30 to 75 mol % of isophthalic acid, 20 to 70 mol % of one ore more $\alpha,\beta$-olefinic unsaturated $C_{4-4}$-dicarboxylic acids and 0 to 20 mol % of a 1,2- or 1,4-benzenedicarboxylic acid, a saturated aliphatic $C_{4-12}$-dicarboxylic acid, a cycloaliphatic $C_{8-10}$-dicarboxylic acid, or a mixture thereof, and the monomer alcohol component comprises (A) 10 to 90 mol % of neopentyl glycol and 10 to 90 mol % of 1,4-bis-(hydroxymethyl)-cyclohexane, a mixture of diols of said formula, or a mixture thereof; or (B) 0 to $<20$ mol % of 1,2-propanediol and $>80$ to 100 mol % of 1,4-bis-(hydroxymethyl)-cyclohexane, a mixture of diols of said formula, or a mixture thereof.

7. A coating agent of claim 6 wherein the monomer acid component comprises 30 to 70 mol % of isophthalic acid and 30 to 70 mol % of fumaric acid, maleic acid or anhydride or a mixture thereof.

8. A coating agent of claim 6 wherein the monomer acid component comprises 40 to 60 mol % of isophthalic acid and 40 to 60 mol % of fumaric acid, maleic acid or anhydride or a mixture thereof.

9. A coating agent of claim 7 or 8 wherein the monomer alcohol component comprises 40 to 90 mol % of neopentyl glycol and 10 to 60 mol % of 1,4-bis-(hydroxymethyl)-cyclohexane, a mixture of diols of said formula, or a mixture thereof.

10. In a method of coating a metallic substrate comprising applying a coating agent thereto and drying the latter whereby a coating adheres to the metallic substrate, the improvement wherein the coating agent is one of claim 1 whereby the adhesiveness of the coating to the metallic substrate is improved.

11. In an article comprising a metallic substrate with a coating thereon, the improvement wherein the coating is applied by the method of claim 10.

* * * * *